United States Patent [19]

Hüellwegen

[11] 4,255,812
[45] Mar. 10, 1981

[54] SIGNAL REGENERATING APPARATUS WITH DC COMPENSATION

[75] Inventor: Joseph Hüellwegen, Altenbeken, Fed. Rep. of Germany

[73] Assignee: Nixdorf Computer AG, Paderborn, Fed. Rep. of Germany

[21] Appl. No.: 49,150

[22] Filed: Jun. 18, 1979

[30] Foreign Application Priority Data

Jun. 16, 1978 [DE] Fed. Rep. of Germany ....... 2826536

[51] Int. Cl.$^3$ ........................................... H04L 25/28
[52] U.S. Cl. ..................................... 375/4; 178/70 R
[58] Field of Search ................... 179/81 R, 82, 170 J, 179/170 K; 178/70 R, 70 TS, 43; 375/3, 4, 37, 58; 330/10; 328/164

[56] References Cited

U.S. PATENT DOCUMENTS 3,997,733 12/1976 Sanders .......................... 179/81 R

FOREIGN PATENT DOCUMENTS 2504785 8/1976 Fed. Rep. of Germany .

Primary Examiner—Thomas A. Robinson
Attorney, Agent, or Firm—Marianne Rich

[57] ABSTRACT

In known signal regenerating apparatus a high frequency signal is continuously applied to the secondary side and inductively coupled back to a resonant circuit on the primary side. The resultant oscillations in the resonant circuit are modulated by the incoming communication signals. The so-modulated signals are coupled back to the secondary side where they are demodulated. The demodulated signals are identical to the communication signals except for a DC component. A separate rectifier circuit, similar to the demodulator circuit is therefore provided for rectifying the high frequency signal. The rectified high frequency signal constitutes a DC voltage which, when combined with the demodulated signals, will remove the undesired DC component therefrom.

8 Claims, 2 Drawing Figures

SIGNAL REGENERATING APPARATUS WITH DC COMPENSATION

Cross reference to related applications and publications: No. DT OS 25 04 785, filed Feb. 5, 1975, inventor: Josef Huellwegen; applicant: Nixdorf Computer AG, Paderborn, Fed. Rep. of Germany.

The present invention relates to signal regenerating apparatus which receives signals from ungrounded communication lines and which has a primary side coupled to the communication line and a secondary side which is electrically decoupled from the primary side but inductively coupled thereto. The communications signals received from the line modulate high frequency oscillations on the primary side and the corresponding signals are rederived on the secondary side by demodulation of the so-modulated signal.

BACKGROUND AND PRIOR ART

The cross-referenced German published application discloses a signal regenerating device as described above. The apparatus disclosed therein is suitable for transmission of either analog or digital signals. Signals can be transmitted at high speeds and with very small amplitudes so that the apparatus is particularly useful for linear transmission of measuring signals. In this equipment the oscillations from a high frequency generator on the secondary side are inductively coupled to a resonant circuit on the primary side. A modulation circuit on the primary side modulates the oscillations in dependence on the communication signals received at the input of the apparatus. The modulated high frequency signals are inductively coupled to a demodulation circuit on the secondary side. The demodulation circuit removes the high frequency components and its output is an exact reproduction of the input signals. Depending upon the type of construction and the sensitivity of the modulation circuit, signals of variable amplitude may be regenerated so that either analog or digital signals may be processed. The shape of the output signals of the regenerating apparatus is exactly that of the input signals since the amplitude of the input signals determines the amplitude of the high frequency oscillations coupled back to the secondary side.

In this known apparatus the high frequency generator continually furnishes high frequency oscillations and these high frequency oscillations are modulated by the incoming signals. This causes an undesired DC component to appear after demodulation. This DC component must be removed if the output signals are to be an exact reproduction of the input signals. In the known apparatus the removal of the DC component was accomplished by an output amplifier which had a predetermined threshold voltage. However, variations of the undesired DC component can occur due to temperature-dependent changes in the output voltage and/or frequency of the high frequency generator. Such varying effects cannot be removed by a constant threshold of an output amplifier.

SUMMARY OF THE INVENTION

It is an object of the present invention to remove the above-mentioned undesired DC component reliably in spite of any of the above-mentioned temperature effects.

In accordance with the present invention means are provided for rectifying the output of the high frequency signal generator and for combining the so-furnished compensating signal with the demodulated signal so as to cancel the DC component of the latter.

The undesired DC component present after demodulation is thus compensated for with a further DC voltage whose variation with respect to time will be exactly the same as that of the undesired DC component. Thus variations in the output of the high frequency signal generator resulting, for example, from temperature changes will be properly compensated. The signals appearing at the output of the frequency regenerating apparatus (repeating apparatus) will thus be exactly the same as the signals received from the communication line. The apparatus according to the present invention is thus capable of processing signals having amplitudes of only about 30% of the signals which can be reliably processed by the prior art apparatus.

In a particularly preferred embodiment the compensating signal and the demodulated signal are applied to two inputs of a difference amplifier whose output constitutes the output of the apparatus. A substraction of the compensating signal from the demodulated signal is thus readily accomplished and amplification of the output signal also takes place.

In a further preferred embodiment, the output signals of the high frequency signal generator are applied to the input of a further emplifier whose output is, in turn, applied to a coil inductively coupled to the primary side. The internal resistance of the amplifier is matched to the equivalent resistance of the tuned resonant circuit as reflected to the output of this amplifier. This allows the high frequency signals to be introduced to the apparatus without a special coupling coil. Further, the additional amplifier prevents feedback to the high frequency signal generator so that its operating point can remain independent of operating voltage variations.

The demodulator circuit and the separate rectifier circuit may each comprise the emitter-collector circuit of a transistor as a rectifier element. This further improves the temperature compensation accomplished by the present invention. The collector-emitter voltage across a transistor when the transistor is in a conductive state is so small that it is temperature independent for all practical purposes. The AC voltage which is to be rectified by each of the transistors is substantially higher than the corresponding base-emitter voltage so that the voltage at the collector corresponds for all practical purposes to the peak voltage applied to the emitter.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

FIG. 1 is an overall circuit diagram of the apparatus of the present invention; and FIG. 2 is a more detailed circuit diagram of the high frequency signal generator and additional amplifier of the circuit of FIG. 1.

DESCRIPTION OF THE PREFERRED EMBODIMENT

Figure 1:
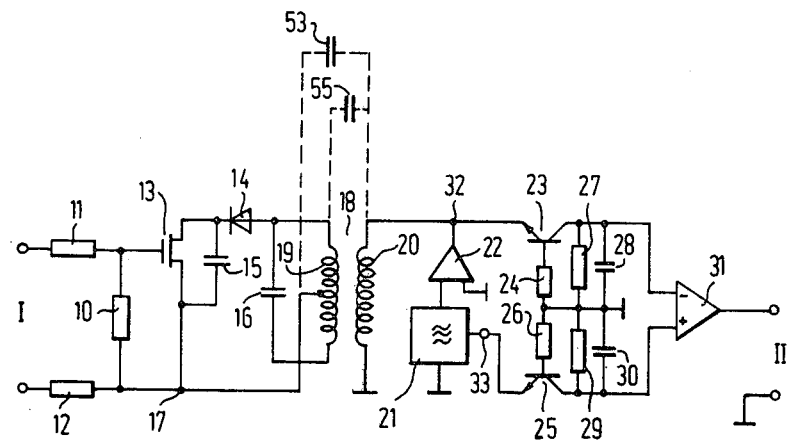

The apparatus shown on FIG. 1 has a signal input I and a signal output II. There is no electrical connection between signal input I and signal output II. No common ground connection is present.

The two input lines of the regenerating or repeater apparatus include resistors 11 and 12, respectively. Correct dimensioning of resistors 11 and 12, as will be discussed in detail below, can result in the cancellation of any noise appearing symmetrically at the two input terminals. An input resistor 10 is a very high resistance and is connected to the gate of an MOS field effect transistor 13. The latter, together with a diode 14, constitute a modulation circuit which is connected in parallel to a resonant circuit comprising a capacitor 16 and an inductance 19. The MOS field effect transistor effectively isolates the communication line from the high frequency signals generated in the repeater apparatus. Specifically, an MOS field effect transistor has no rectification effect between its output circuit and its control circuit so that a DC offset feedback cannot occur. Because the field effect transistor is connected with the resonant circuit through diode 14, it is driven with a DC voltage component, as is advantageous to its operation. Finally, the use of an MOS field effect transistor results in the advantage that optimum amplification takes place even in the absence of bias on the control electrode. Thus signals of varying polarity, that is signals changing in both directions relative to the potential of the control electrode may be applied to the input of the repeater apparatus, both causing a corresponding modulation of the high frequency oscillations induced in the resonant circuit.

The high frequency oscillations are generated by a high frequency signal generator 21 whose output is amplified by a driving amplifier 22. The output of amplifier 22 is applied at a circuit point 32 on the secondary side to an inductance 20 which, together with inductance 19 arranged on the primary side, forms a transformer 18. Because of the use of amplifier 22 inductance 20 may be a relatively low inductance causing the stray capacitances 53, 55 of the transformer to be relatively small. Since the input I of the apparatus is subject to ground symmetrical noise voltages with very steep leading edges when connected to the communication line, the low stray capacitances are a particular advantage since such noise voltages, which may, for example, correspond to a signal output of ten V/us of high frequency signal generator 21 will be transmitted to the secondary side with a very low amplitude only.

The resonant circuit including capacitor 16 and inductance 19, which is tuned to the frequency of the high frequency signal generator 21, has high frequency oscillations induced therein which are rectified by diode 14 and applied to MOS field effect transistor 13 by a capacitor 15. In the quiescent state of the apparatus, that is with no signal being received at input I, a quiescent DC voltage thus appears across the output circuit of field effect transistor 13. This quiescent voltage may be changed by input signals applied to the gate of the field effect transistor, since its mostly ohmic impedance varies as a function of the amplitude of the input signals. This then results in the modulation of the oscillations induced across the resonant circuit 16/19.

Inductance 19 has a center tap which furnishes the reference potential for the modulation circuit and which is connected to circuit point 17, so that a reference point for high frequency oscillations is created and the connection of the communication line to input I does not cause a detuning of the resonant circuit.

The modulated high frequency signals, that is the signals appearing across resonant circuit 16/19 and modulated in accordance with the input signals induce corresponding AC voltages in inductance 20. These are rectified by a transistor 23 having a base resistor 24. A demodulated DC voltage thus appears across an RC circuit 27/28. This demodulated voltage has an undesired DC component, since the output of high frequency signal generator 21 is continually applied to the apparatus through amplifier 22. The amplitude of the undesired continuous DC voltage component corresponds to the high frequency oscillations induced in inductance 20 in the quiescent state, that is in the absence of communication signals. To remove this component, the high frequency signal generated by generator 21 and furnished at a terminal 33 is rectified by means of a transistor 25 having a base resistor 26 so that a corresponding DC voltage appears across an RC circuit 29/30.

If the DC voltage appearing across RC circuit 29/30 has the same value as the above-described undesired DC component appearing across RC circuit 27/28, then this undesired DC component can be removed in very simple fashion. Specifically, the two voltages can be applied to the inputs of a difference amplifier 31. At the output of the difference amplifier, which also constitutes the output II of the regenerating apparatus, output signals having exactly the same shape as the communication signals applied at input I will then be furnished.

The generation of a compensating DC voltage which has the same amplitude as the undesired DC component of the demodulated signals is quite simple. For example, the signals at terminal 33 of high frequency signal generator 21 may be coupled to transistor 25 through a transformer whose turns ratio is suitably adjusted. Alternatively, the DC value itself, namely the DC voltage across circuit 29/30 may be adjusted by the choice of suitable components. A fine tuning of the zero point at the output of difference amplifier 31 may be achieved by a slight detuning of resonant circuit 16/19.

For optimal power matching, the output resistance of amplifier 22 is matched to the equivalent resistance of resonant circuit 16/19 as reflected to the secondary side. Under these conditions, the amplitude of the signal at circuit point 32 is one-half the amplitude of the signals furnished by high frequency generator 21. The amplitude of the signal appearing at output 33 of high frequency signal generator 22 must be course be correspondingly reduced.

| REPRESENTATIVE VALUES AND CIRCUIT COMPONENTS USED IN THE CIRCUIT OF FIG. 1 ARE AS FOLLOWS: | |
| --- | --- |
| Resistor 10 | 1 megohm |
| Resistor 11 | 22 kiloohms |
| Resistor 12 | 680 ohms |
| Transistor 13 | 3 N 200 |
| Capacitor 15 | 1 nanofarad |
| Capacitor 16 | 330 picofarads |
| Inductance 19 | 77 microhenrys |
| Stray capacitances 53 and 55 smaller than 10 picofarads each | |
| Inductance 20 | 1 microhenry |

Figure 2:
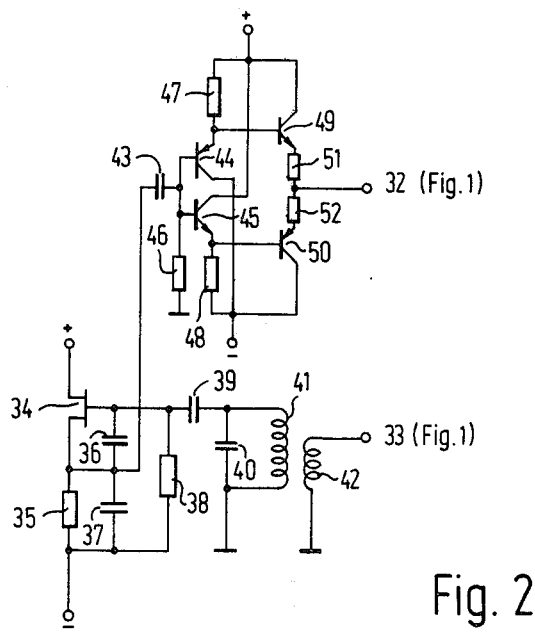

FIG. 2 shows the high frequency signal generator 21 and amplifier 22 in greater detail. The active element in high frequency signal generator 21 is a field effect transistor 34. A resonant circuit including a capacitor 40 and an inductor 41 is connected to the gate of field effect transistor 34 through a coupling capacitor 39. A capacitive voltage divider including capacitors 36 and 37 is connected between the gate of field effect transistor 34 and the negative supply line. The voltage divider has a tap which is connected to the drain electrode of field effect transistor 34. The latter is connected through a load resistor 35 to the negative supply line and is further connected through a coupling capacitor 43 to the input of amplifier 22. A resistor 38 is connected in parallel with voltage divider 36/37. The latter provides the required bias voltage for the gate of the field effect transistor.

The high frequency signal generated by high frequency signal generator 21 is applied to output 33 by a coil 42 inductively coupled to the above-mentioned inductor 41. The amplitude of the signal at output 33 will thus depend on the turns ratio between inductor 41 and coil 42.

A coiling capacitor 43 connects the output of high frequency signal generator 21 to the input of amplifier 22. One terminal of capacitor 43 is connected to the base of each of two transistors 44, 45 having a common base resistor 46. Transistors 44 is a p-n-p transistor, while transistor 45 is an n-p-n transistor. The emiter of transistor 44 is connected through a resistor 47 to the positive supply line, while the emitter of transistor 45 is connected through a resistor 48 to the negative supply line. The emitter of transistor 44 is directly connected to the base of a transistor 49, while that of transistor 45 is connected directly to the base of a transistor 50. The collector of transistor 49 is directly connected to the positive supply line, that of transistor 50 directly to the negative supply line. The emitter of transistor 49 is connected through a resistor 51 to output 32, while the emitter of transistor 50 is connected to output 32 through a resistor 52. Transistors 44 and 45 operate in a grounded collector type of configuration and furnish control signals for transistors 49, 50, respectively, at their respective emitters. The common point of the emitter resistors of transistors 49 and 50 is of course the same circuit point as point 32 of FIG. 1.

Since transistor 23 and difference amplifier 31 (FIG. 1) react to very small signal amplitudes and have a very high resolution, a further improvement of the circuit results from the elimination of noise voltages generated on the secondary side due to symmetrical noise voltages appearing at input I.

Specifically, a noise voltage appearing at the input terminal connected to resistor 11 will be inverted and amplified by field effect transistor 13 and then will be transmitted through stray capacitance 55 to the secondary side. However, a corresponding noise voltage applied at the lower input terminal of the apparatus, that is at the terminal connected to resistor 12, will be directly transmitted to the secondary side through stray capacitance 53. An elimination of the noise voltage on the secondary side can thus be accomplished by increasing the value of resistor 11 so that the signal appearing on the secondary side following inversion and amplification by field effect transistor 13 will be the same as that transmitted through stray capacitance 53. The resultant noise signals on the secondary side will then cancel each other out, eliminating this source of error.

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. In a communication system having ungrounded lines for transmission of communication signals and signal regenerating apparatus having an ungrounded primary side connected to said transmission line for receiving said communication signals and a secondary side electrically isolated from but inductively coupled to said primary side for furnishing output signals corresponding to said communication signals, said regenerating apparatus comprising resonant circuit means on said primary side, modulation means connected to said resonant circuit means and said transmission line for modulating high frequency oscillations induced in said resonant circuit means in accordance with said communication signals thereby creating modulated high frequency signals across said resonant circuit means, said regenerating apparatus further comprising means connected to said secondary side for generating high frequency signals, means for inductively coupling said high frequency signals to said resonant circuit means thereby inducing said high frequency oscillations therein, and means connected on said secondary side for demodulating said modulated high frequency signals thereby creating demodulated signals corresponding to said communication signals but having an undesired DC component, the improvement comprising rectifier means connected to said high frequency signal generating means for rectifying said high frequency signals and furnishing a DC compensating signal corresponding thereto; and means connected to said rectifier means and said demodulating means for combining said demodulated signals and said DC compensating signal to remove said undesired DC component thereby creating said output signals corresponding to said communication signals.

2. A communication system as set forth in claim 1, wherein said combining means comprises a difference amplifier having a first and second input terminal, and means for applying said demodulated signals and said DC compensating signal to said first and second input terminal, respectively.

3. A communication system as set forth in claim 1, wherein said inductive coupling means comprises a first coil;

wherein said resonant circuit means comprises a second coil inductively coupled to said first coil and a capacitor connected in parallel with said second coil;

wherein said demodulating means comprises a first transistor having an emitter-collector circuit interconnected between said first coil and said combining means;

and wherein said rectifier means comprises a second transistor having an emitter-collector circuit interconnected between said high frequency signal generating means and said combining means.

4. A communication system as set forth in claim 1, wherein said resonant circuit means comprises an inductance having a minimal stray capacitance.

5. A communication system as set forth in claim 1, further comprising amplifier means connected between said high frequency signal generating means and said inductive coupling means.

6. A communication system as set forth in claim 5, wherein said resonant circuit means presents a predetermined equivalent resistance to the output of said amplifier means when tuned to a resonant frequency corresponding to the frequency of said high frequency signals; and wherein the internal resistance of said amplifier means corresponds to said equivalent resistance.

7. A communication system as set forth in claim 4, wherein said resonant circuit means comprises a second coil having a first and second end terminal and a center tap;
wherein said stray capacitance includes a first and second stray capacitance respectively coupling said secondary side to said center tap said first end terminal;
wherein said modulating means comprises a field effect transistor having a source-drain circuit connected from said first end terminal to said center tap of said second coil and a gate;
and wherein said signal regenerating apparatus further comprises a first and second input terminal connected to said transmission line, first resistance means connected between said first input terminal and said gate of said field effect transistor, and second resistance means connected between said center tap and said second input terminal.

8. A communication system as set forth in claim 7, wherein a first noise signal is received at said first input terminal and a second noise signal in phase with said first noise signal is received at said second input terminal, whereby an amplified and inverted first noise signal is transmitted to said secondary side through said second stray capacitance and said second noise signal is transmitted to said secondary side through said first stray capacitance;
and wherein said first resistance means has a resistance value exceeding the resistance value of said second resistance means so that said amplified and inverted second noise signal received on said secondary side has an amplitude substantially equal to the amplitude of said second noise signal received on said secondary side.

* * * * *